(12) United States Patent
Buchanan et al.

(10) Patent No.: US 9,588,651 B1
(45) Date of Patent: Mar. 7, 2017

(54) MULTIPLE VIRTUAL ENVIRONMENTS

(71) Applicant: Amazon Technologies, Inc., Seattle, WA (US)

(72) Inventors: John William Buchanan, Seattle, WA (US); Ryan Anthony Stemen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 14/495,792

(22) Filed: Sep. 24, 2014

(51) Int. Cl.
*G06F 3/048* (2013.01)
*G06F 17/21* (2006.01)
*G06F 3/0483* (2013.01)
*G06F 3/0481* (2013.01)

(52) U.S. Cl.
CPC ........ *G06F 3/0483* (2013.01); *G06F 3/04815* (2013.01); *G06F 17/211* (2013.01)

(58) Field of Classification Search
CPC ............. G06F 3/04815; G06F 17/3089; G06F 17/30905
See application file for complete search history.

(56) References Cited

U.S. PATENT DOCUMENTS

| | | | | |
|---|---|---|---|---|
| 7,559,034 B1* | 7/2009 | Paperny | ............. | G06F 9/44526 345/629 |
| 8,358,842 B2* | 1/2013 | Hsu | ...................... | G06F 17/212 382/173 |
| 8,838,591 B2* | 9/2014 | Hull | ...................... | G06F 17/211 707/736 |
| 9,063,953 B2* | 6/2015 | Hull | .................. | G06F 17/30247 |
| 9,349,219 B2* | 5/2016 | Schrag | .................... | G06T 19/20 |
| 9,436,357 B2* | 9/2016 | Pallakoff | ............... | G06F 3/0483 |
| 2002/0083101 A1* | 6/2002 | Card | .................... | G06F 3/04815 715/207 |
| 2002/0093538 A1* | 7/2002 | Carlin | .................... | G06Q 30/02 715/778 |
| 2002/0103822 A1* | 8/2002 | Miller | ............... | G06F 17/30896 715/201 |
| 2002/0180734 A1* | 12/2002 | Endoh | ................. | G06F 3/04815 345/428 |
| 2006/0120624 A1* | 6/2006 | Jojic | ................. | G06F 17/30843 382/284 |
| 2011/0310104 A1* | 12/2011 | Dicke | .................... | G06T 13/80 345/473 |

OTHER PUBLICATIONS

Nonstopbar.com, Interactive Comic, Jun. 1, 2014, pp. 1-23 https://web.archive.org/web/20140601004836/http://nonstopbar.com/.*

(Continued)

*Primary Examiner* — Scott Baderman
*Assistant Examiner* — Mario M Velez-Lopez
(74) *Attorney, Agent, or Firm* — Thorpe North & Western LLP

(57) ABSTRACT

Technology is described for generating an electronic book. A 3D (three dimensional) virtual environment may be identified. A scene depicting a 3D virtual sub-environment may be identified. A page object may be generated in the 3D virtual environment. A plurality of page panels may be generated that include the scene depicting the 3D virtual sub-environment and the page panels are associated with the page object.

21 Claims, 11 Drawing Sheets

(56) References Cited

OTHER PUBLICATIONS

Digitalmeetsculture.net, Digital comics go interactive, Mar. 23, 2014, pp. 1-4 https://web.archive.org/web/20140323194439/http://www.digitalmeetsculture.net/article/digital-comics-go-interactive/.*
Using 3d software to make a comic, Mar. 7, 2011, pp. 1-5 https://www.youtube.com/watch?v=qq9QEn5etYU.*
The Gwaii—3D comic book for iPhone, iPad, & Mac, Jul. 18, 2011, pp. 1-5 https://www.youtube.com/watch?v=Gv0DBwOH8BE.*

\* cited by examiner

MULTIPLE VIRTUAL ENVIRONMENTS

BACKGROUND

The field of computer graphics may involve generating three-dimensional (3D) scenes and displaying the 3D scenes using a two-dimensional (2D) space, such as a display screen. For example, a 3D representation of geometric data may be rendered for display as a 3D scene on the display screen. The 3D scene may be composed of a plurality of objects. Each object may be composed of a plurality of geometric primitives. A color and a brightness level may be associated with each object in the 3D scene. In addition, the objects may be located on an imaginary Z-axis that represents the depth of object from a virtual camera capturing the 3D scene.

Creating a 3D scene may include a modeling phase, a scene layout phase and a rendering phase. The modeling phase may involve forming computer models of objects that are to be included in the 3D scene. The scene layout phase may involve placement of the objects onto the 3D scene. The rendering phase may involve generating an image from the objects placed onto the 3D scene. The 3D scene may be generated for display on the display screen according to a graphics pipeline or rendering pipeline.

DETAILED DESCRIPTION

Figure 1:
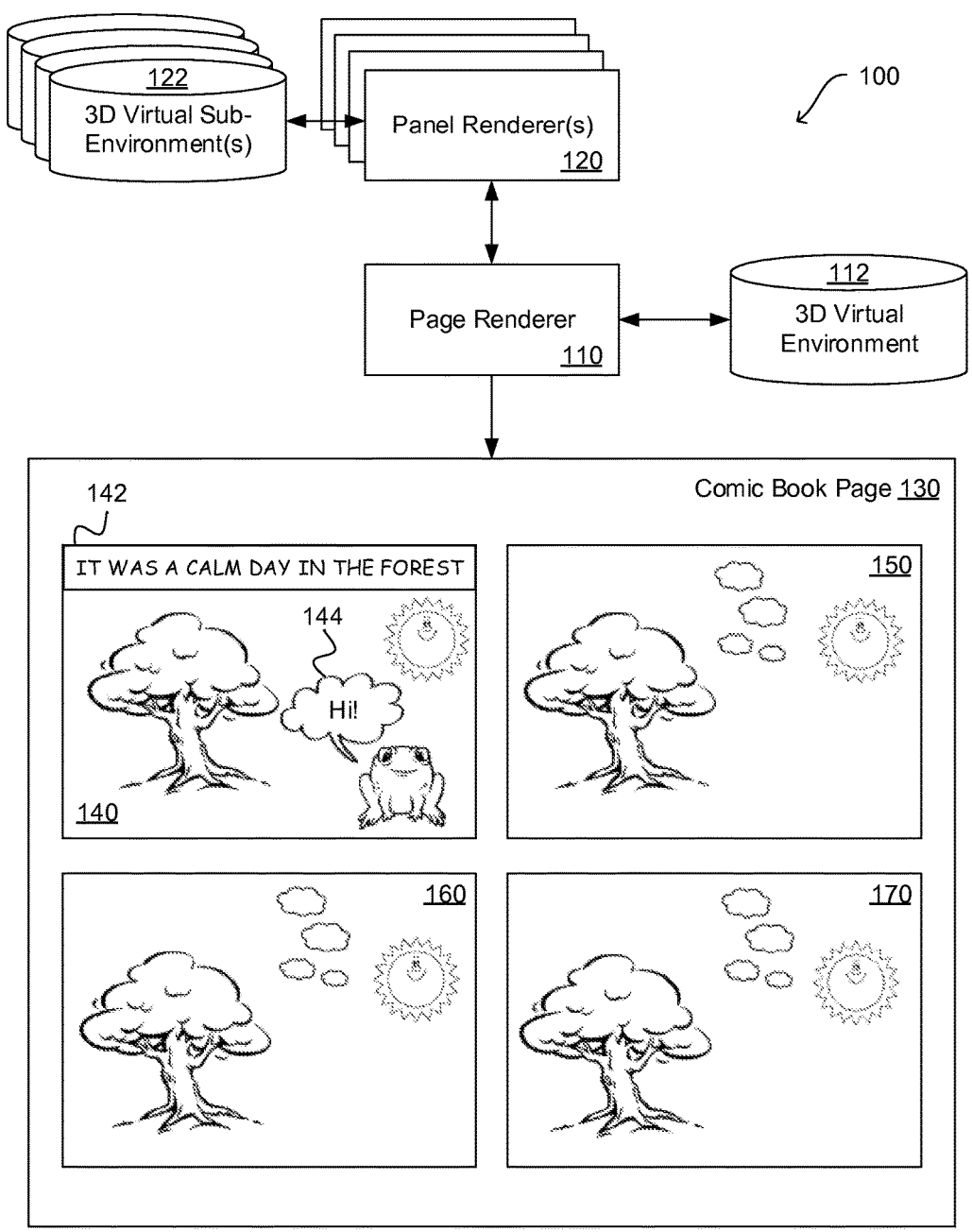
FIG. 1 illustrates a system and related operations for generating a comic book page for an electronic comic book using a page renderer and generating a plurality of comic book panels for the comic book page using multiple panel renderers according to an example of the present technology.

A technology is described for generating an interactive electronic book with graphics and providing the interactive electronic book to a user. For example the interactive electronic book may be a comic book with graphics. The electronic comic book may contain at least one comic book page (also referred to as a page object). The comic book page may be provided in a three-dimensional (3D) virtual environment viewed using a virtual camera from an orthographic view. The 3D virtual environment may be a computer-based simulated environment that is displayed to the user. A plurality of comic book panels (also referred to as page panels) may be displayable in front of the comic book page. Each comic book panel may provide a scene depicting a 3D virtual sub-environment. The 3D virtual sub-environment may be a separate environment as compared to the 3D virtual environment and may not be a sub-part of the 3D virtual environment. Each comic book panel scene may be rendered using a virtual camera looking into an interactive 3D virtual world or 3D virtual sub-environment. The 3D virtual world may allow for user interaction, e.g., a user may explore the 3D virtual world, perform queries within the 3D virtual world, perform actions, interact with other users, carry out missions via a character or the user's avatar within the 3D virtual world, etc.

In one example, the interactive 3D virtual environment may be generated and viewable through a page renderer, such as an orthographic page renderer. The comic book page may be generated in the interactive 3D virtual environment. As an example, the comic book page may be a blank page of a specified color (e.g., a blank white or colored page) in the 3D virtual environment. In addition, the interactive 3D virtual environment may include page presentation objects, e.g., objects that are displayed in front of the comic book page. Examples of page presentation objects may include characters walking in front of the comic book page or curtains opening to reveal the comic book page.

Scenes depicting 3D virtual sub-environments may be viewable through perspective panel renderers. The scenes may be included on comic book panels that are located in front of the comic book page. As a non-limiting example, nine comic book panels may be located in front of the comic book page, and the nine comic book panels may each display a separate 3D virtual sub-environment using nine panel renderers. The 3D virtual sub-environments may be interactive 3D scenes or 3D virtual worlds that enable user interaction. The 3D sub-environments may depict a wide variety of landscapes and/or objects, such as cities, buildings, castles, houses, vehicles, jungles, beaches, rainforests, rivers, deserts, mountains, fantasy backdrops, etc. Both the 3D virtual environment and the 3D virtual sub-environments may be generated via the page renderer and the panel renderers, respectively, using one or more databases of geometries and textures. The term virtual sub-environment refers to an environment that is contained within the 3D virtual environment representing the page. However, the virtual sub-environment may be of equal or greater complexity than the main 3D virtual environment.

In one example, one comic book panel may be active at a time. More specifically, one comic book panel at a time may be receiving user interaction and rendering a scene for a user to view. The comic book panels that are not currently receiving user interaction (e.g., inactive comic book panels) may be represented by static images. A static image displayed for an inactive comic book panel may represent a current state (i.e., last rendered state) of the 3D virtual sub-environment that is associated with that inactive comic book panel (e.g., the last frame rendered for the 3D virtual sub-environment). The user may switch from an active comic book panel (i.e., a comic book panel that is receiving user interaction) to a comic book panel that was previously inactive. In this example, the previously active comic book panel may become inactive and represented with a static image (e.g., a static image representing a current state of the 3D virtual world when the user switched between comic book panels), and the previously inactive comic book panel may become active. When the user switches between comic book panels, a virtual camera may be activated in the now active comic book page and the panel renderer may begin rendering additional scene frames. Further, the user may interact with the active comic book page. Since the comic book panels are not being simultaneously rendered (i.e., one comic book panel may be rendered at a time), the comic book page may include a large number of comic book panels with relatively complex 3D virtual sub-environments that are capable of receiving user interaction. Therefore, a fully interactive multi-panel display of a storyline may be provided to a user device with less powerful processing capacities than might otherwise be expected.

In one configuration, panel overlays may be associated with the comic book panels. The panel overlays may include decorators, descriptors, speech bubbles, thought bubbles and/or other types of graphic overlays. The decorators may represent exclamatory sounds effects, graphics or word effects that are displayed when certain events occur at the 3D scene (e.g., a BAM when a hero punches a monster). The descriptors may be narratives describing a particular 3D scene in a comic book panel (e.g., "the hero enters the room and sees the princess in distress"). The speech bubbles may be dialogue spoken by characters in the 3D scene. The thought bubbles may be unspoken thoughts for characters in the 3D scene. In one example, the panel overlays may be within the boundaries of the comic book panel, or alternatively, the panel overlays may be outside the comic book panel on the comic book page. The panels may be polygonal in shape or the panels may be irregularly shaped.

In one example, the page renderer may interact with the panel renderers in order to display the comic book panels depicting the 3D virtual sub-environments in front of the comic book page. The page renderer may request a 3D virtual sub-environment (e.g., a rendered 3D scene) from an active panel renderer. The page renderer may receive the rendered frame(s) of the 3D virtual sub-environment from the active panel renderer, and then display the frames of the 3D virtual sub-environment in the active comic book panel. The page renderer may include a panel border surrounding the rendering of the 3D virtual sub-environment. In addition, the page renderer may request, from the active panel renderer, the panel overlays that are associated with the active comic book panel. Upon receipt of the panel overlays, the page renderer may display the panel overlays for the active comic book panel.

The page renderer may display the static images from a frame buffer of a respective panel renderer for the comic book panels that are inactive (i.e., the comic book panels that are not currently receiving user interaction) along with the active comic book panel in front of the comic book page. The page renderer may receive the static images from the inactive panel renderers, or alternatively, the page renderer may retrieve static images for the inactive comic book panels that were previously stored in a cache. Thus, the page renderer may take the 3D virtual sub-environment received from the active page renderer and the static images associated with the inactive page renderers, and then map them to the appropriate comic book panels for display in front of the comic book page.

In one configuration, the page renderer may arrange: the comic book page in the 3D virtual environment, the comic book panels providing the 3D virtual sub-environments, and the panel overlays at various page depths within a depth space. The comic book page, the comic book panels and the panel overlays may each be located at separate depths within the depth space for the page in order to avoid depth fighting. Depth fighting may occur when multiple objects have the same page depths. In one example, the page renderer may display the comic book page furthest away from the virtual camera. In other words, the comic book page may be assigned a relatively low depth value (e.g., a depth value of −10). The comic book panels may be displayed in front of the comic book page, and therefore, the comic book panels may be assigned depth values that are higher than the depth value (closer to the virtual camera) associated with the comic book page. In addition, each comic book panel may be located within a defined range of depth values (or depth range). For example, a first comic book panel may be located within a depth range of −9.9 to −9 in the depth space. A second comic book panel may be within a depth range of −8.9 to −8 in the depth space, i.e., the second comic book panel may be closer to the virtual camera as compared to the first comic book panel but this may be undetectable to the user in the orthographic view.

In addition, the panel overlays associated with a particular comic book panel may be arranged within the depth range (or depth space) associated with that comic book panel. For example, the panel overlays associated with the first comic book panel may be located in the depth range of −9.9 to −9, but may be assigned depth values that are higher (closer to a virtual camera) than the depth value of the first comic book panel. The panel overlays associated with the second comic book panel may be located in the depth range of −8.9 to −8, but may be assigned depth values that are higher than the depth value of the second comic book panel. For this example, the panel overlays associated with the first comic book panel may include a decorator, a first speech bubble and a second speech bubble. The decorator may be located at a depth value of −9.8, a first speech bubble may be located at a depth value of −9.7, and a second speech bubble may be located at a depth value of −9.6. In one example, the decorators may be arranged closest to the virtual camera as compared to other panel overlays (i.e., the decorators may be assigned the relatively highest depth values in the depth space), and then followed by the narratives, the speech bubbles and the thought bubbles, respectively.

FIG. 1 illustrates a system 100 and related operations for generating a comic book page 130 (also referred to as a page object) for an electronic comic book using a page renderer 110 and generating a plurality of comic book panels (also referred to as page panels) using a plurality of panel renderers 120. The page renderer 110 may generate a view of a 3D virtual environment and include the comic book page 130 in the 3D virtual environment. The page renderer 110 may render a view of the 3D virtual environment using a 3D virtual environment data store 112. The 3D virtual environment data store 112 may store a set of geometries, textures, etc. that enables the page renderer 110 to generate a view of the 3D virtual environment. In the example shown in FIG. 1, the page renderer 110 may generate the comic book page 130 to be a solid background color in the 3D virtual environment.

The panel renderers 120 may render 3D virtual sub-environments (e.g., 3D virtual worlds) using 3D virtual sub-environment data stores 122. The 3D virtual sub-environment data stores 122 may store sets of geometries, textures, etc. that enable the panel renderers 120 to generate the 3D virtual sub-environments. The page renderer 110 may receive the 3D virtual sub-environments from the panel renderers 120 via a separate frame buffer for each panel renderer. As a non-limiting example, the page renderer 110 may receive a 3D virtual sub-environment depicting a character in a forest. In addition, the page renderer 110 may receive a descriptor 142 and a speech bubble 144 for the 3D virtual sub-environment depicting the character in the forest.

The page renderer 110 may display a comic book panel 140 that includes the 3D virtual sub-environment (e.g., the 3D scene of the character in the forest) with which the comic book panel 140 has been linked. For example, the panel renderer 120 may be providing a view of the 3D virtual sub-environment at 30 frames per second (fps) and those frames are passed on to the page renderer 110 that may be outputting images at 30 or 60 fps.

In addition, the page renderer 110 may generate the comic book panel 140 to include the descriptor 142 and the speech bubble 144. In one example, the page renderer 110 may place the comic book panel 142 at a defined depth value within a depth space. The descriptor 142 and the speech bubble 144 may be assigned depth values that are greater than the depth value assigned to the comic book panel 140, and the descriptor 142 and the speech bubble 144 may be displayed in front of the comic book panel 140, as a result. In addition, the page renderer 110 may identify static images for inactive comic book panels on the comic book page 130. Thus, the page renderer 110 may display static images for comic book panels 150, 160, 170. The page renderer 110 may assign increasing depth values for the comic book panel 150, the comic book panel 160 and the comic book panel 170, such that each comic book panel is displayed in front of a previous comic book panel.

The 3D virtual environment and the 3D virtual sub-environments may have virtual cameras looking into their respective 3D virtual worlds. In one example, the page renderer 110 may provide the 3D virtual environment from an orthographic point of view that is a fixed view. In other words, the page renderer 110 may render the 3D virtual environment with a limited sense of perspective so that the comic book page 130 appears flat despite the depth features included in the scene. The page renderer 110 may include the 3D virtual sub-environments in the comic book panels 140, 150, 160, 170 that use a perspective point of view. Further, the page renderer 110 may render the 3D virtual sub-environments with a 3D perspective where the virtual camera is movable by the user viewing the 3D virtual sub-environment, and the objects within the 3D virtual sub-environments may become smaller with distance.

Figure 2A:
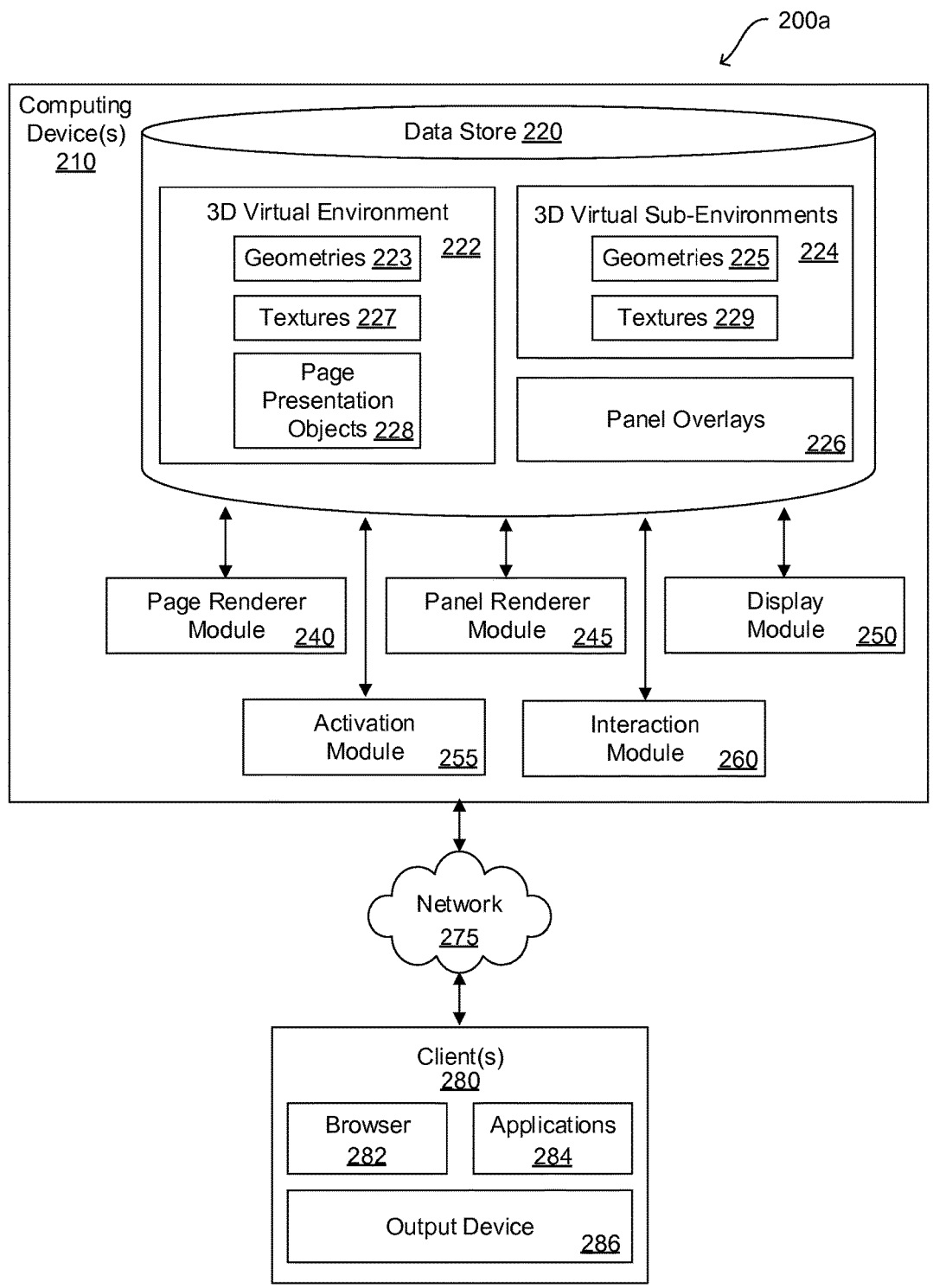
FIG. 2A is an illustration of a networked system for generating an electronic comic book according to an example of the present technology.

In the following discussion, a general description of an example system for generating comic book pages and the system's components are provided. The general description is followed by a discussion of the operation of the components in a system for the technology. FIG. 2A illustrates a networked environment 200a according to one example of the present technology. The networked environment 200a may include one or more computing devices 210 in data communication with a client 280 by way of a network 275. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a 3D virtual environment 222, including relevant geometries 223, textures 227, etc. The 3D virtual environment 222 may be a computer-based simulated environment that displays a comic book page (or page object) for an electronic comic book and other 3D objects that may be presented over (or in front of) the electronic comic book page. In other words, the comic book page may be generated in the 3D virtual environment 222. The 3D virtual environment 222 may include 3D scenes, buildings, objects, characters, etc. The 3D virtual environment 222 may be created from a set of geometries, textures, etc. The 3D virtual environment 222 may be displayed from a perspective point of view using a virtual camera.

In one example, the 3D virtual environment 222 may include page presentation objects 228. The page presentation objects 228 may be objects that are displayed in the 3D virtual environment 222. The page presentation objects 228 may not be associated with comic book panels on the comic book page, but rather, the page presentation object 228 may be associated with the comic book page itself. Some examples of page presentation objects 228 may include a bird that flies on the comic book page in front of the comic book panels, a character that walks in front of the comic book panels, or a curtain that opens to show the comic book panels behind the curtain. The page presentation objects 228 may be composed from the set of geometries, textures, etc. in the 3D virtual environment 222. In addition, the page presentation objects 228 may be arranged according to depth values in a depth space, such that the page presentation objects 228 are displayed in front of the comic book page, the comic book panels and the panel overlays 226.

The data stored in the data store 220 may include 3D virtual sub-environments 224, including relevant geometries 225, textures 229, etc. The 3D virtual sub-environments 224 may be computer-based simulated environments that are rendered to be displayed in comic book panels (or page panels). The comic book panels may be located in the scene in front of the comic book page using a depth axis. In one example, the 3D virtual sub-environments 224 may be associated with a virtual gaming world. The 3D virtual sub-environments 224 may include interactive 3D scenes or 3D virtual worlds that allow for user interaction, virtual camera movement, model actions, storyline interaction, etc. The 3D virtual sub-environments 224 may include a wide variety of landscapes and/or objects, such as characters, buildings, castles, houses, vehicles, jungles, beaches, rainforests, cities, rivers, deserts, mountains, etc. Each 3D virtual sub-environment 224 may contain a plurality of objects that make up the 3D scene. The 3D virtual sub-environments 224 may be created using a shared set of geometries, textures and resources or a mixture of shared resources and independent resources may be used (e.g., mixed sets of geometries, textures) etc. Alternatively, each of the virtual sub-environments 224 may be created using an independent set of geometries, textures, etc. The 3D virtual sub-environments 224 may be displayed from an orthographic point of view or a perspective point of view.

The data stored in the data store 220 may include panel overlays 226. The panel overlays 226 may be objects that are associated with one or more of the comic book panels on the comic book page. The panel overlays 226 may be sized to be constrained within the border of the comic book panel, or alternatively, the panel overlays 226 may extend outside the border of the comic book panel on the comic book page. The panel overlays 226 may include, but are not limited to, decorators, descriptors, speech bubbles and/or thought bubbles. The decorators may represent exclamatory sounds effects or word effects that are displayed to represent certain events occurring in the 3D virtual sub-environment 222 (e.g., a BAM when a hero punches a monster in a 3D scene). The descriptors may be narratives describing a particular 3D virtual sub-environment 222 displayed in a panel (e.g., "the hero enters the room and sees the princess in distress"). The speech bubbles may be dialogue spoken by characters in the 3D virtual sub-environment 222. The thought bubbles may be unspoken thoughts for characters in the 3D virtual sub-environment 222. In addition, the panel overlays 226 may be arranged according to depth values in a depth space, so that the panel overlays 236 are displayed in front of the comic book panels. The panel overlays 226 may be arranged within the depth space according to a defined hierarchy. For example, the decorators may appear relatively closest to the virtual camera, followed by the descriptors, the speech bubbles and the thought bubbles, respectively. Of course, other panel hierarchies may be defined.

The components executed on the computing device 210 may include a page renderer module 240, a panel renderer module 245, an activation module 250, a display module 255, an interaction module 260 and other applications, services, processes, systems, engines, or functionality not discussed in detail herein. The page renderer module 240 may be configured to generate and render a comic book page in an interactive 3D (three dimensional) virtual environment 222. The interactive 3D virtual environment 222 may be viewable using the page renderer module 240. The 3D virtual environment 222 may include 3D scenes, objects, characters, etc. and the 3D virtual environment 222 may be created from a set of geometries, textures, etc. In one example, the page renderer module 240 may generate the comic book page for an electronic comic book.

The panel renderer module(s) 245 may be configured to generate scenes to depict interactive 3D virtual sub-environments 224 that are viewable using the panel renderer module 245. The 3D virtual sub-environments 224 may include interactive 3D scenes or 3D virtual worlds that allow for user viewing, manipulation and interaction. The panel renderer module 245 may generate comic book panels that include the scenes depicting the interactive 3D virtual sub-environments 224. In one example, the comic book panels may be activatable using an activation module 255 to enable user interaction with the scenes depicting the interactive 3D virtual sub-environments 224 in the comic book panels. The panel renderer module 245 may provide the comic book panels including the scenes depicting the interactive 3D virtual sub-environments 224 (e.g., rendered 3D scenes) to the page renderer module 240, and the page render module 240 may create an output for the comic book panels that is displayable on a display screen.

The display module 250 may be configured to send the comic book page in the electronic comic book to a client for display. For example, the comic book page may be displayed on a mobile device or tablet computer. The display module 250 may send a single comic book panel on the comic book page, or alternatively, may display a plurality of comic book panels on the comic book page. A user may interact with the comic book page via input controls on the client and/or gestures provided to a display screen of the client. The display module 250 may send the rendered frames to a stand-alone application on the client or through a web browser where interaction from a user may be captured.

The activation module 255 may be configured to activate a comic book panel on the comic book page that is currently receiving interaction from a user. An active comic book panel may display the interactive 3D virtual sub-environment 224. In addition, the activation module 255 may deactivate the comic book panels that are not currently receiving interaction from the user. More specifically, the activation module 255 may also de-activate the panel renderer module 245 for any panel that is not active. Thus, a rendering pipeline may be active for a single panel at a time while the rendering pipeline for inactive panels may be suspended until the respective inactive panel is reactivated. This focuses the processing power and resources on one panel at a time. The activation module 255 may display static images for the comic book panels that are deactivated. The static images may represent current state or statuses (e.g., last frame buffer output) of the 3D virtual sub-environments 224 associated with the deactivated comic book panels.

The interaction module 260 may be configured to receive interactions from the user that are performed on the client (e.g., the client that is displaying the electronic comic book). The interaction module 260 may receive user actions within the 3D virtual environment and/or 3D virtual sub-environments so that the comic book page and the comic book panels may be correctly rendered and displayed to the user. For example, the interaction module 260 may detect when a particular comic book panel is activated or deactivated. The interaction module 260 may detect user actions performed within a specific 3D virtual sub-environment so that subsequent 3D virtual sub-environments may be generated accordingly.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The client 280 may be representative of a plurality of client devices that may be coupled to the network 275. The client 280 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability.

The client 280 may be configured to execute various applications such as a browser 282, and/or other applications 284. The applications 284 may correspond to code that is executed in the browser 282 (e.g., web applications). The applications 284 may also correspond to standalone applications, such as networked applications. In addition, the client 280 may be configured to execute applications 284 that include, but are not limited to, shopping applications, video playback applications, standalone applications, email applications, instant message applications, and/or other applications.

The client 280 may include or be coupled to an output device 286. The browser 282 may be executed on the client 280, for example, to access and render network pages (e.g. web pages) or other network content served up by the computing device 210 and/or other servers. The output device 286 may comprise, for example, one or more devices such as cathode ray tubes (CRTs), liquid crystal display (LCD) screens, gas plasma-based flat panel displays, LCD projectors, or other types of display devices, etc. In addition, the output device 286 may include an audio device, tactile device (e.g., braille machine) or another output device to feedback to a customer.

Figure 2B:
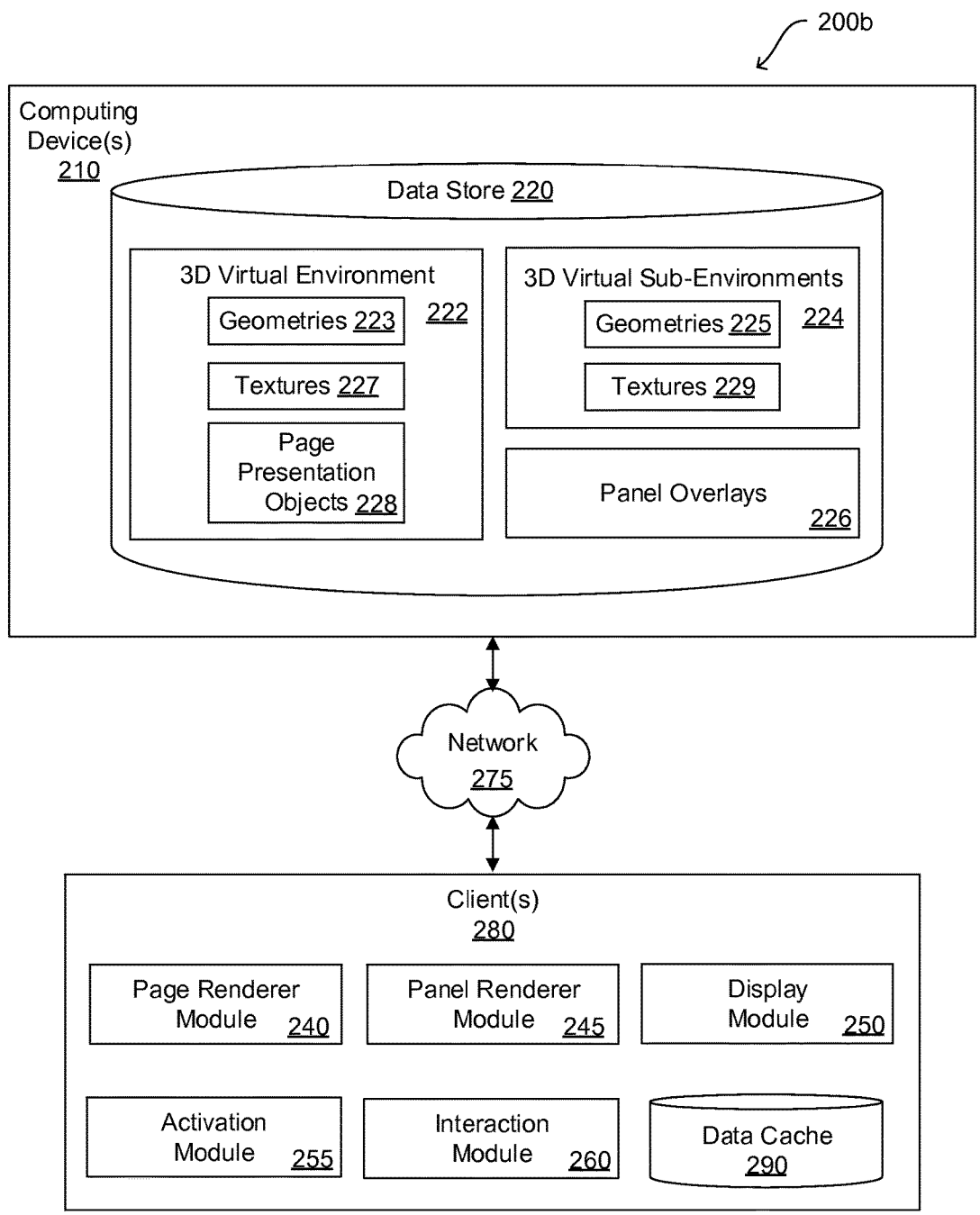
FIG. 2B is an additional illustration of a networked system for generating an electronic comic book according to an example of the present technology.

FIG. 2B illustrates a networked environment 200b according to one example of the present technology. The networked environment 200b may include one or more computing devices 210 in data communication with a client 280 by way of a network 275. Various data may be stored in a data store 220 that is accessible to the computing device 210. As previously described, the data store 220 may include a 3D virtual environment, including relevant geometries 223, textures, etc. and page presentation objects 228. The data store 220 may include 3D virtual sub-environments 224, including relevant geometries 225, textures, etc. In addition, the data store 220 may include panel overlays 226.

The client 280 may include a page renderer module 240, a panel renderer module 245, a display module 250, an activation module 255, an interaction module 260 and a data cache 290. The page renderer module 240 may be configured to generate and render a comic book page in an interactive 3D (three dimensional) virtual environment 222. The panel renderer module(s) 245 may be configured to generate scenes to depict interactive 3D virtual sub-environments 224 that are viewable using the panel renderer module 245. The display module 250 may be configured to display the comic book page in the electronic comic book on the client 280. The activation module 255 may be configured to activate a comic book panel on the comic book page that is currently receiving interaction from a user. The interaction module 260 may be configured to receive interactions from the user that are performed on the client 280. In addition, the data cache 290 may locally store geometries, textures, resources, etc. for generating the 3D virtual environment or the 3D virtual sub-environments at the client 280.

Figure 3:
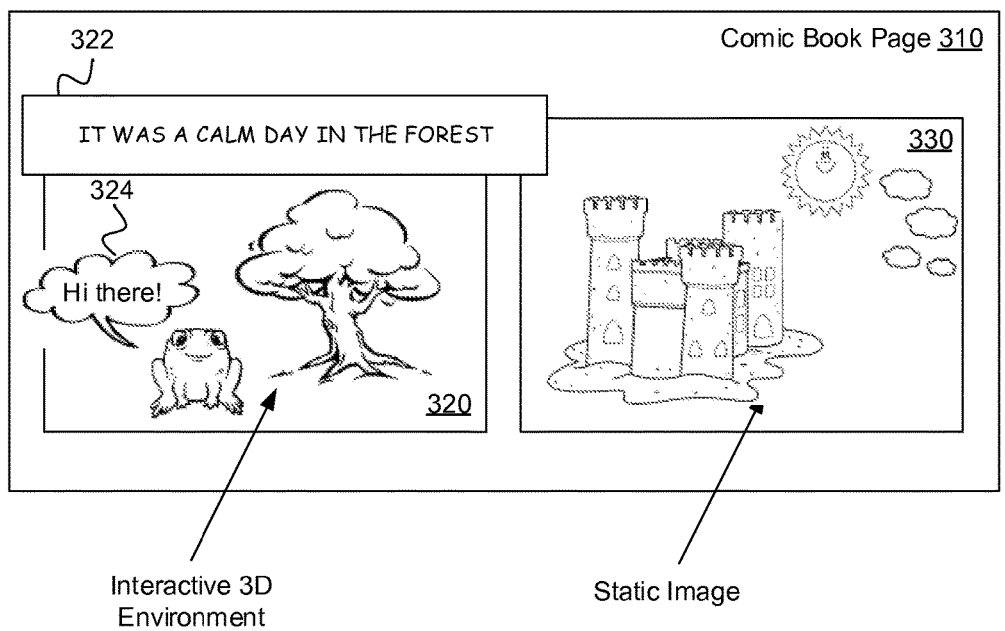
FIG. 3 illustrates a comic book page for an electronic comic book that contains an active comic book panel and an inactive comic book panel according to an example of the present technology.

FIG. 3 illustrates a comic book page 310 for an electronic comic book. The comic book page 310 may be generated in a 3D virtual environment. A first comic book panel 320 that is active and a second comic book panel 330 that is inactive may be displayed on a client in front of the comic book page 310. In one example, the comic book page 310 may be referred to as a page object and the comic book panel may be referred to as page panels. The comic book panel 320 may display an interactive 3D virtual sub-environment, i.e., a 3D scene or a 3D virtual world. The 3D scene may contain a number of objects, such as trees, buildings, characters, landscapes, castles or any objects that may be modeled in a computer environment. The 3D virtual sub-environment may be a separate environment as compared to the 3D virtual environment and may not be a sub-part of the 3D virtual environment. In the example shown in FIG. 3, the 3D scene in the active comic book panel 320 may display a forest scene. The active comic book panel 320 may allow a user to perform a number of interactions with the 3D scene rendered in the active comic book panel 320. For example, the user may explore the 3D scene from the virtual camera's point of view, perform queries within the 3D scene, carry out missions or quests via a character or the user's avatar within the 3D scene, move objects, fight other characters, etc.

The comic book panel 320 may include a descriptor 322 describing the 3D scene, as well as a speech bubble 324 depicting character dialogue in the 3D scene. As illustrated in FIG. 3 the descriptor 322 may extend outside the panel's perimeter when the panel is activated. Once the panel is deactivated, then the descriptor 322 may be reduced in size and not extend outside the panel perimeter. Alternatively, the descriptor 322 may disappear or just be cropped by the panel perimeter. This behavior may also apply to the speech bubble 324.

In one example, the user may not interact with both the first comic book panel 320 and the second comic book panel 330 simultaneously. Therefore, the second comic book panel 330 may be inactive when the first comic book panel 320 is active. The second comic book panel 330 that is inactive may display a static image representing a current state of a 3D scene or a 3D world as viewed by a virtual camera. In the example shown in FIG. 3, the 3D scene in the inactive comic book panel 330 may display a castle scene. The user may easily switch between different comic book panels on the comic book page 310, which will re-initiate the rendering of that comic book panel. Therefore, the user may be provided with an illusion that each comic book panel on the comic book page 310 is fully active. In one example, the user may decide to stop interacting with the first comic book panel 320 and start interacting with the second comic book panel 330. The user may decide to perform the switch after completing assigned tasks on the first comic book panel 320 or simply because the user is bored and wishes to interact with a different 3D scene. When the user switches comic book panels (e.g., via finger gestures on a device screen, a pointer device selection, or via other types of input provided to the client), the first comic book panel 320 may become inactive and the second comic book panel 330 may become active. The first comic book panel 320 may display a static image of a state of the 3D scene when the user switched to the second comic book panel 330, and the second comic book panel 330 may provide an interactive 3D virtual sub-environment.

In one configuration, the comic book page 310 may be displayed in a 3D virtual environment using a page renderer (not shown in FIG. 3). In addition, the page renderer may communicate with a plurality of panel renderers in order to display the scenes depicting the 3D virtual sub-environments in front of the comic book page 310. For example, the page renderer may receive a rendered 3D scene for the comic book panel 320 from an active panel renderer associated with the comic book panel 320. The page renderer may generate the comic book panel 320 on the comic book page 310 using the rendered 3D scene. An inactive (or deactivated) panel renderer may be associated with the inactive comic book panel 330. The page renderer may have minimal communication with the inactive page renderer when the comic book panel 330 is inactive. For example, the page renderer may retrieve a cached static image associated with the inactive panel renderer and display the static image on the comic book page 310 to represent a current state of a 3D scene in the inactive comic book panel 330.

In one example, the 3D virtual sub-environment in the active comic book panel 320 may be generated using an independent database of geometries, textures, etc. When a comic book panel goes from active to inactive, the geometries and textures used to generate the 3D virtual sub-environment associated with the comic book panel may be cached to a mass storage drive. When the comic book panel goes from inactive to active, the geometries and textures may be pulled back in and used to generate the 3D virtual sub-environment. If enough volatile memory is available, the resources used for rendering a comic book panel 320 may remain unused in memory until needed again. Alternatively, one or more 3D virtual sub-environments may be generated using a shared database of geometries, textures and resources. For example, both the comic book panel 320 and the comic book panel 330, when active, may be generated using the same database of information for the 3D virtual sub-environments.

Figure 4:
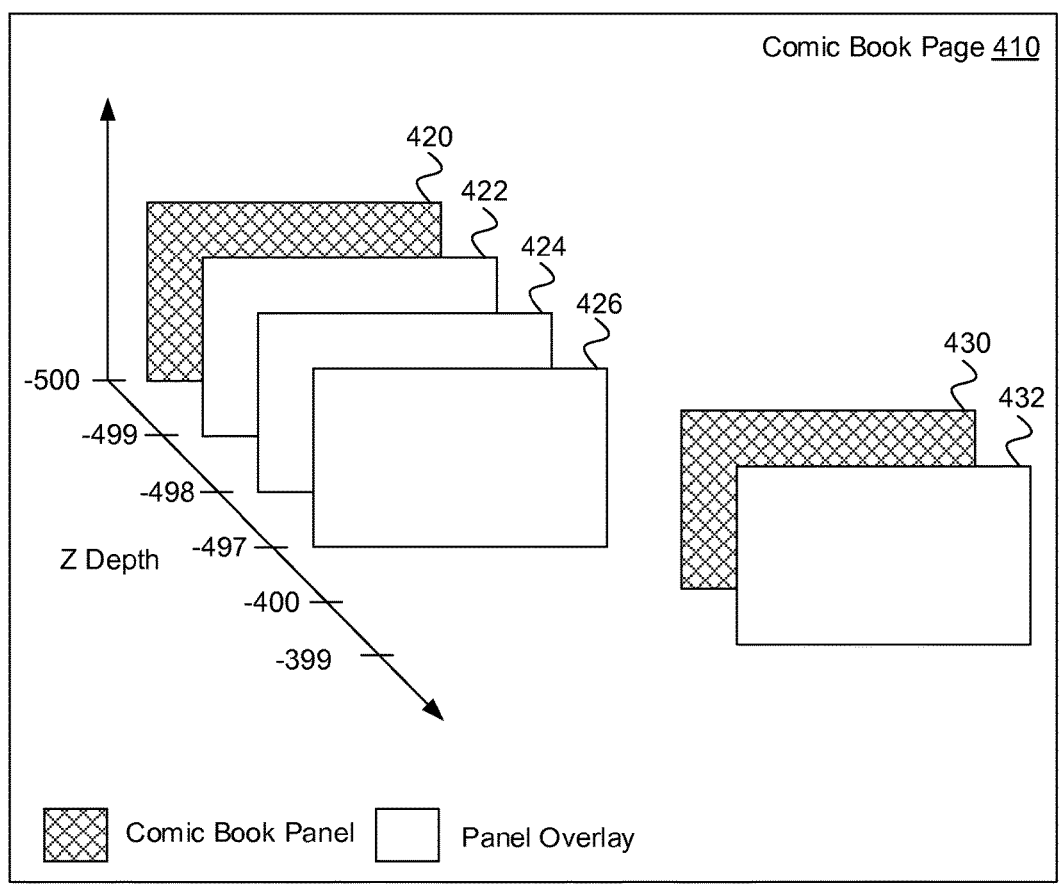
FIG. 4 illustrates a plurality of comic book panels and panel overlays arranged at various page depths within a depth space according to an example of the present technology.

FIG. 4 illustrates a plurality of comic book panels and panel overlays arranged at various page depths within a depth space. A comic book page 410 may include the comic book panels and the panel overlays. In other words, the comic book panels and the panel overlays may be displayed in front of the comic book page 410. In order to avoid Z fighting (i.e., objects having the same depth value within the depth space), the comic book panels and the panel overlays may each be assigned distinct depth values within the depth space.

In one example, the comic book page 410 may be furthest away from the virtual camera (i.e., the comic book page 410 may appear as the farthest object on a display screen). As a non-limiting example, the comic book page 410 may be assigned a depth value (or a Z depth value) of −501. The comic book panels and the panel overlays, since they are to appear in front of the comic book page 410 on the display screen, may be assigned a higher depth value (i.e., −500 and above). The higher the depth value, the closer the object may appear to the virtual camera.

As an example, a first comic book panel 420 may be assigned a depth value of −500. Since the depth value of the first comic book panel 420 is higher than the depth value for the comic book page 410, the first comic book panel 420 may appear in front of the comic book page 410. The panel overlays associated with the first comic book panel 420 may be assigned depth values that are higher than the depth value for the first comic book panel 420 (i.e., −500), but lower than the next comic book panel (i.e., a second comic book panel 430) on the comic book page 410. In other words, the panel overlays associated with the first comic book panel 420 may appear in front of the first comic book panel 420, but spatially behind the second comic book panel 430 in the depth space.

Each comic book panel and the associated panel overlays for the comic book page 410 may be assigned a panel depth range (or depth space) within the overall depth space. As a non-limiting example, the first comic book panel 420 may be assigned the depth range of −500 to −401. The first comic book panel 420 may be associated with panel overlays 422, 424, 426. Each of these panel overlays may be assigned a depth value within the panel depth range of the first comic book panel 420 (i.e., between −500 and −401). For example, a first panel overlay 422 may be assigned a depth value of −499, a second panel overlay 424 may be assigned a depth value of −498, and a third panel overlay 426 may be assigned a depth value of −497. Thus, the depth range for the first comic book panel 420 may be large enough to include all the panel overlays associated with the first comic book panel 420.

The second comic book panel 430 may be assigned a depth range that is sequentially higher than the depth range assigned to the first comic book panel 420. In one example, the second comic book panel 430 may be arranged to appear in front of the first comic book panel 420 since the second comic book panel 430 is to be consumed after the first comic book panel 420. As a non-limiting example, the second comic book panel 430 may be assigned the depth range of −400 to −301. A fourth panel overlay 432 that is associated with the second comic book panel 430 may be assigned a depth value within the depth range associated with the second comic book panel 430, e.g., a depth value of −399.

As previously described, the panel overlays may include decorators, descriptors, speech bubbles and/or thought bubbles. In one configuration, the panel overlays may be assigned depth values depending on the type of panel overlay. For example, the decorators may be assigned depth values that are greater than depth values assigned to the descriptors, speech bubbles and thought bubbles. In other words, the decorators may appear closest to the virtual camera as compared to the descriptors, speech bubbles and thought bubbles. The descriptors may be arranged behind the decorators, but in front of the speech bubbles and thought bubbles. In other words, the depth values assigned to the descriptors may be less than the depth values assigned to the decorators, but greater than the depth values assigned to the speech bubbles and thought bubbles. The speech bubbles may be arranged behind the decorators and descriptors (i.e., the speech bubbles have depth values less than the depth values for the decorators and descriptors), and the thought bubbles may be arranged behind the decorators, descriptors, and speech bubbles.

As a non-limiting example, the panel overlay 426 may be a decorator (i.e., the third panel overlay 426 may be the closest object to the virtual camera for the first comic book panel 420), the second panel overlay 424 may be a decorator and the first panel overlay 422 may be a speech bubble. As another non-limiting example, both the second panel overlay 424 and the third panel overlay 426 may be decorators arranged slightly in front of one another, and the first panel overlay 422 may be a speech bubble arranged spatially behind the second panel overlay 424 and the third panel overlay 426.

In one configuration, a page renderer (not shown in FIG. 4) may arrange the comic book page 410, the comic book panels 420, 430 and the panel overlays 422-426, 432 at the various depths within the depth space for display on the client. For example, the page renderer may display the comic book page 410 furthest away from the virtual camera. The page renderer may display the first comic book panel 420 and the second comic book panel 430 on the comic book page 410 according to their panel depth values. In addition, the page renderer may display the panel overlays associated with each of the comic book panels on the comic book page 410. In particular, the page renderer may display the first panel overlay 422, the second panel overlay 424 and the third panel overlay 426 within a predefined depth range associated with the first comic book panel 420 (e.g., between the depth values of −500 to −401). In addition, the page renderer may display the fourth panel overlay 432 within a predefined depth range associated with the second comic book panel 430 (e.g., between the depth values of −400 and −301).

Figure 5:
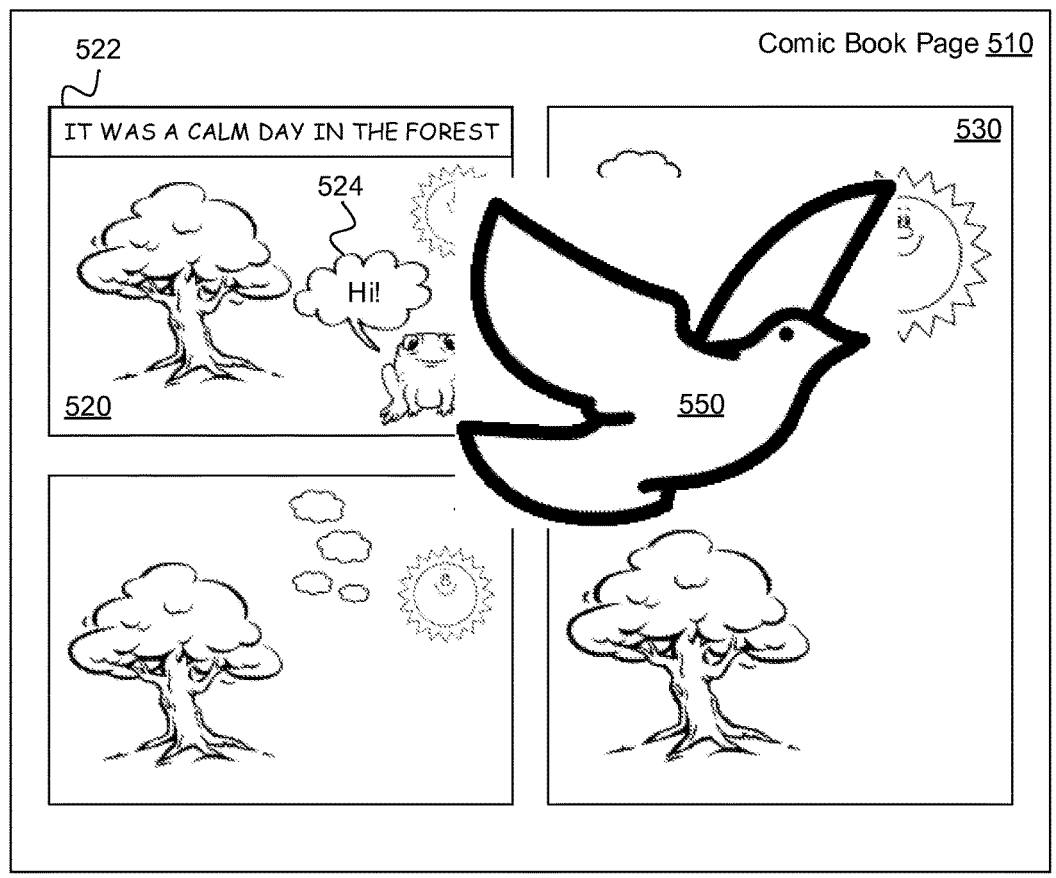
FIG. 5 illustrates a comic book page for an electronic comic book that displays a page presentation object sequentially in front of a plurality of comic book panels according to an example of the present technology.

FIG. 5 illustrates a comic book page 510 for an electronic comic book that displays a page presentation object 550 sequentially in front of a plurality of comic book panels. The comic book page 510 may be displayed in a virtual environment. A first comic book panel 520 may be arranged in front of the comic book page 510 and depict an interactive 3D virtual sub-environment (i.e., a 3D scene). The first comic book panel 520 may include a descriptor 522 and a speech bubble 524 associated with a character in the 3D scene. The first comic book panel 520 may be an active panel that allows user interaction with the 3D scene in the comic book panel 520. In addition, a second comic book panel 530 and a third comic book panel 540 may be arranged in front of the comic book page 510. The second comic book panel 530 and third the comic book panel 540 may be inactive, and therefore, may display static images of 3D scenes.

In one example, the comic book page 510, the first comic book panel 520, the second comic book panel 530 and the third comic book panel 540 may each be arranged according to various page depths in a depth space. The comic book page 510 may be farthest away from the virtual camera, followed by the first comic book panel 520, the second comic book panel 530 and the third comic book panel 540, respectively. In other words, the first comic book panel 520 may be assigned a depth value that is farther away from the virtual camera as compared to the depth values assigned to the other comic book panels.

In one configuration, the comic book page 510 may display the page presentation object 550. The page presentation object 550 may be an object (e.g., a bird) that is displayed in the 3D virtual environment. As another example, the page presentation object 550 may represent a 3D curtain that opens to show the comic book panels 520, 530 and 540 behind the curtain. In an additional example, the page presentation object 550 may represent a character that walks in front of the comic book panels 520, 530 and 540 and acts as a narrator. The page presentation object 550 may be assigned a depth value that is closest to the virtual camera as compared to the comic book page 510 and the comic book panels 520, 530, 540. In other words, the page presentation object 550 may appear in front of the other comic book panels on the comic book page 510.

Figure 6:
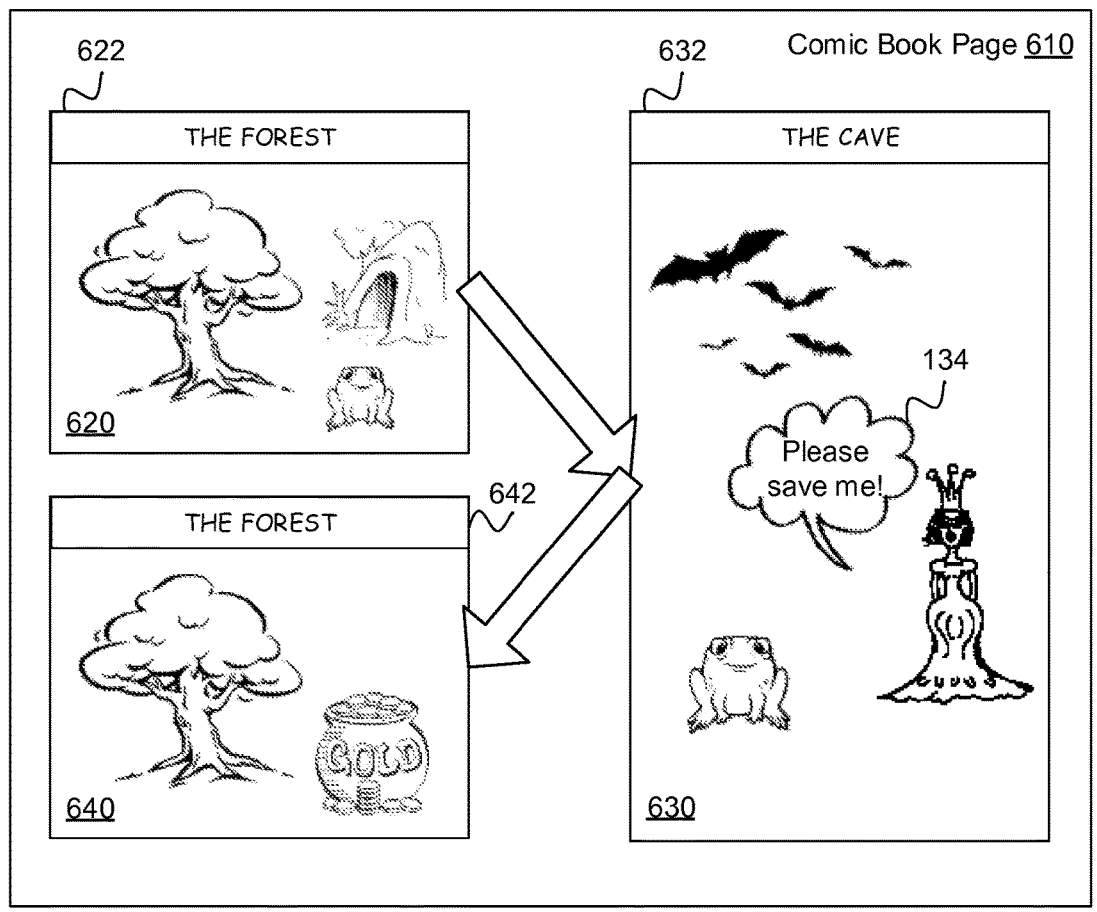
FIG. 6 illustrates a series of comic book panels on a comic book page that are each generated based on previous user interactions with the comic book panels according to an example of the present technology.

FIG. 6 illustrates a series of comic book panels on a comic book page 610 that are each generated based on previous user interaction with the comic book panels. As an example, a first comic book panel 620 displayed in front of the comic book page 610 may depict a 3D scene of a forest. The first comic book panel 620 may include a descriptor 622 describing the 3D scene. A user may perform a number of interactions with the 3D scene in the first comic book panel 620. For example, the user may explore the forest depicted in the 3D scene. When the user is interacting with the first comic book panel 620, a second comic book panel 630 and a third comic book panel 640 may be inactive. For example, when interacting with the first comic book panel 620, the user may navigate a character through the forest and into a cave. The user's action of entering into the cave may achieve an assigned task for the first comic book panel 620 and the user may then switch to the second comic book panel 630. Thus, the user may go back and forth between the comic book panels on the comic book page 610. In one example, the user may navigate through three comic book panels on the comic book page 610, and then go back to a previous panel.

When the user provides instructions to activate a new comic book panel on the comic book page 610 (e.g., the second comic book panel 630), a previous comic book panel (e.g., the first comic book panel 620) may become inactive and the new comic book panel may become active. Based on the user's actions within the 3D scene in the first comic book panel 620, the comic book panels 630, 640 may be generated to depict certain 3D scenes. For example, since the user successfully reached the cave in the first comic book panel 620, the second comic book panel 630 may be generated to include a 3D scene in the cave. In other words, the user's past interactions may influence the 3D scenes generated in later comic book panels. If the user were to not reach the cave in the first comic book panel 620 (e.g., the user reached a river) and then switched to the second comic book panel 630, a different 3D scene may be generated in the second comic book panel 630 (e.g., the 3D scene may display the river).

According to the example shown in FIG. 6, the second comic book panel 630 may display the 3D scene of the cave. The second comic book panel 630 may include a descriptor 632 describing the 3D scene. The user may navigate through the 3D scene and discover a princess in distress. The second comic book panel 630 may include a speech bubble 134 indicating dialogue spoken by the princess in the 3D scene. The user may perform actions to rescue the princess and exit the cave. The user's action of rescuing the princess may satisfy the assigned task for the second comic book panel 630 and the user may provide instructions to switch to the third comic book panel 640. The third comic book panel 640 may include a descriptor 640 indicating that the 3D scene has reverted back to the forest. In addition, the third comic book panel 640 may include an object (e.g., a pot of gold) because the princess was rescued in the previous comic book panel. If the user has not rescued the princess in the previous comic book panel, the pot of gold may not appear in the third comic book panel 640. Thus, the user's interaction with 3D scenes in the comic book panels may influence which 3D scenes and/or objects are generated in subsequent comic book panels on the comic book page 610.

As another non-limiting example, the user may control a character in a first comic book panel. The user may control the character to navigate through several panels, and in the process, may be presented with an option to either pick up a weapon or pick up a flower. The user, believing that the character may meet a heroine in a subsequent panel, may instruct the character to pick up the flower. The user may navigate the character through subsequent comic book panels, and three panels forward, the character may unexpectedly encounter a villain. Since the flower may be futile when encountering the villain, the character may go back to the previous comic book panel and pick up the weapon. The character may navigate back to the comic book panel with the villain and fight the villain using the weapon. The character may then retrieve the flower and meet the heroine. As shown in this example, the 3D scenes in the comic book panels, the objects within those 3D scenes and/or a storyline may be influenced based on the user's interaction with the characters and/or 3D scenes in the comic book panels.

In one configuration, a single comic book panel may be displayed in front of the comic book page 610. When the user provides instructions (e.g., via a touch screen or other input device) to switch to a new comic book panel, the new comic book panel may appear on the comic book page 610. The new comic book panel may appear in addition to the previous comic book panel (i.e., the comic book panel that now displays a static image), or alternatively, the new comic book panel may replace the previous comic book panel. In another configuration, the comic book panel that the user is currently interacting with may occupy a substantial portion of a display screen. In other words, the user may choose to blow up the active comic book panel on the display screen. In this configuration, the other comic book panels may not be visible on the comic book page 610. When the user returns to a multi-panel mode on the comic book page 610, the other comic book panels may become visible on the comic book page 610, but may be represented with static images of 3D virtual worlds.

Figure 7:
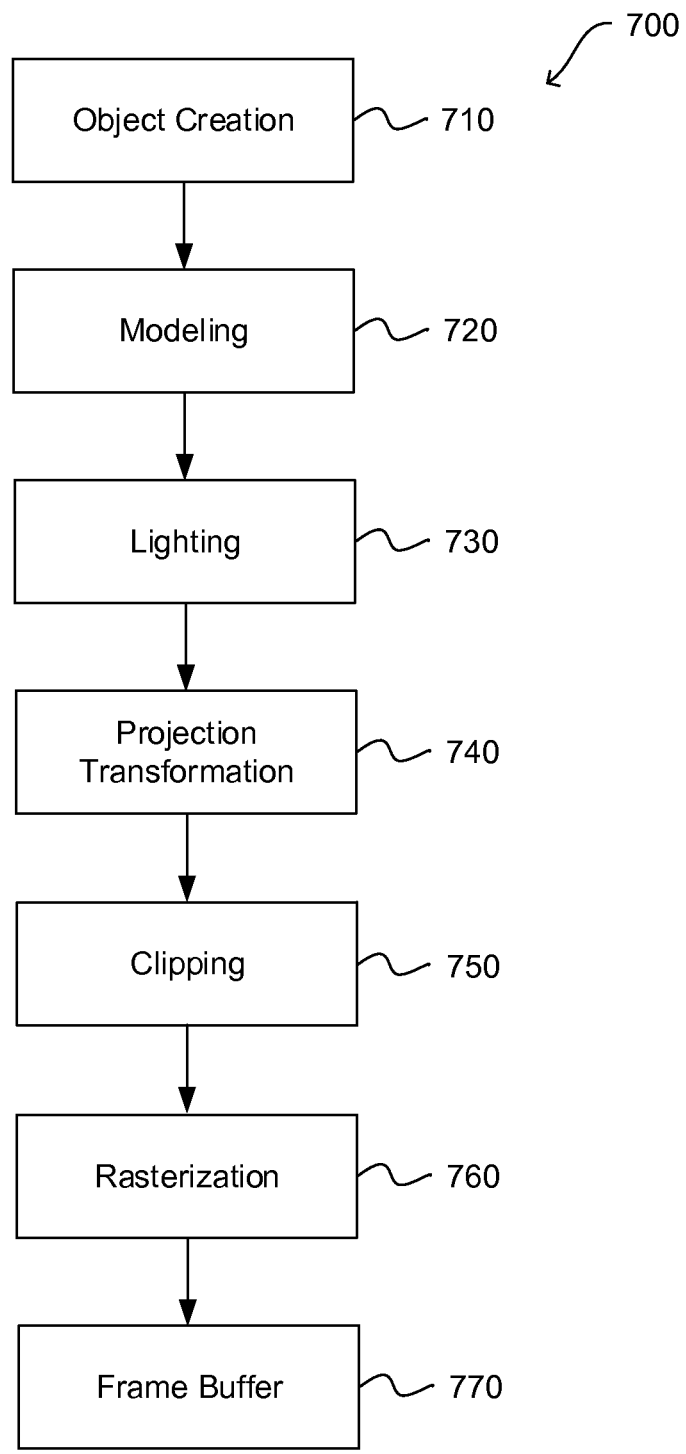
FIG. 7 illustrates a graphics pipeline used for generating 3D virtual environments and 3D virtual sub-environments for a comic book page accordance to an example of the present technology.

FIG. 7 illustrates an exemplary graphics pipeline 700 used for generating a 3D virtual environment and 3D virtual sub-environments for a comic book page. The graphics pipeline 700 or rendering pipeline may refer to a sequence of steps performed to generate the 3D virtual environments and sub-environments for display on a display screen. The graphics pipeline 700 may include object creation 710. During object creation 710, 3D models for objects may be created out of geometric primitives. The geometric primitives may include points, lines, planes, circles, ellipses, triangles and other polygons, etc. In one example, the objects may be stored in a database and used to generate the 3D virtual environment and the 3D virtual sub-environments for the comic book page. During modeling 720, the objects may be transformed from their own model space (i.e., a local coordinate system) to a common coordinate space, also known as a world space or a 3D world coordinate system. Each object and their respective vertices may be positioned, oriented and scaled with a model transform. During lighting 730, the objects may be illuminated based on light sources in the 3D scene and the objects may be provided with color based on material properties of the objects.

During projection transformation 740, the 3D world coordinate system may be transformed into a 2D view of the virtual camera, e.g., the object that the virtual camera is centered on may be in the center of the 2D view of the virtual camera. In other words, during projection transformation 740, 3D points or 3D models may be mapped to a 2D plane. In the case of perspective projection, objects which are distant from the virtual camera may become smaller (e.g., by dividing the X and Y coordinates of each vertex of each geometric primitive by its Z coordinate). In the case of orthographic projection, the objects may retain their original size regardless of distance from the virtual camera. During clipping 750, objects that fall outside of a viewing frustum (e.g., a field of view) may be discarded. During rasterization 760, a 2D image representation of the scene (i.e., a 2D image composed of geometric primitives) may be converted into a raster image (i.e., an image composed of pixels). In other words, the objects in the 2D image may be converted into pixels. The pixels may be output to a frame buffer 770 for display on a display screen. Based on the graphics pipeline 700, a plurality of objects may be generated for creation of the 3D virtual environment and the 3D virtual sub-environments. The page renderer and the panel renderer may each include significant portions of the described graphics pipeline in order to generate the 3D virtual environment and the 3D virtual sub-environments (e.g., blocks 720 to 770).

Figure 8:
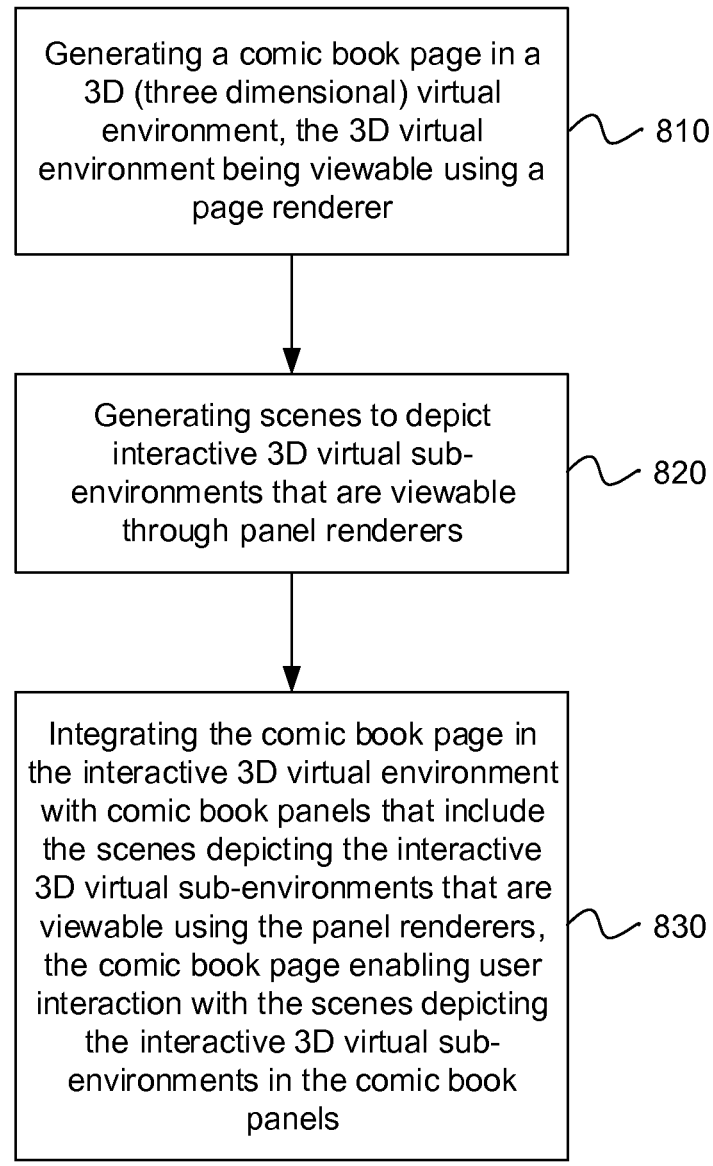
FIG. 8 is a flowchart of an example method for generating an electronic comic book.

FIG. 8 illustrates an example of a method for generating an electronic comic book. A comic book page may be generated in an interactive 3D (three dimensional) virtual environment, the interactive 3D virtual environment being viewable using a page renderer, as in block 810. In one example, the interactive 3D virtual environment may be generated and viewable through an orthographic page renderer.

Scenes may be generated to depict interactive 3D virtual sub-environments that are viewable through panel renderers, as in block 820. The 3D virtual sub-environments may be computer-based simulated environments. The 3D virtual sub-environments may include interactive 3D scenes or 3D virtual worlds that allow for user interaction.

The comic book page in the interactive 3D virtual environment may be integrated with comic book panels that include the scenes depicting the interactive 3D virtual sub-environments that are viewable using the panel renderers, as in block 830. The comic book page may enable user interaction with the scenes depicting the interactive 3D virtual sub-environments in the comic book panels. The comic book page in the electronic comic book may be provided for display to a user. For example, the comic book page may be displayed on the user's computing device.

In one configuration, the scene depicting the interactive 3D virtual sub-environment in the comic book panel may be generated to include geometries or storylines based on previous user interaction with other scenes in the comic book page. In other words, the comic book panels may include updated scenes or storylines based on the user's past interactions with other comic book panels on the comic book page.

In one example, the comic book page may be generated to include panel overlays associated with the comic book panels in the comic book page, the panel overlays including at least one of: decorators, narratives, speech bubbles or thought bubbles. In another example, the comic book panel may be configured to display a static image of a scene depicting an interactive 3D virtual sub-environment when the comic book panel is not active. In other words, the inactive comic book panel may be represented with the static image.

Figure 9:
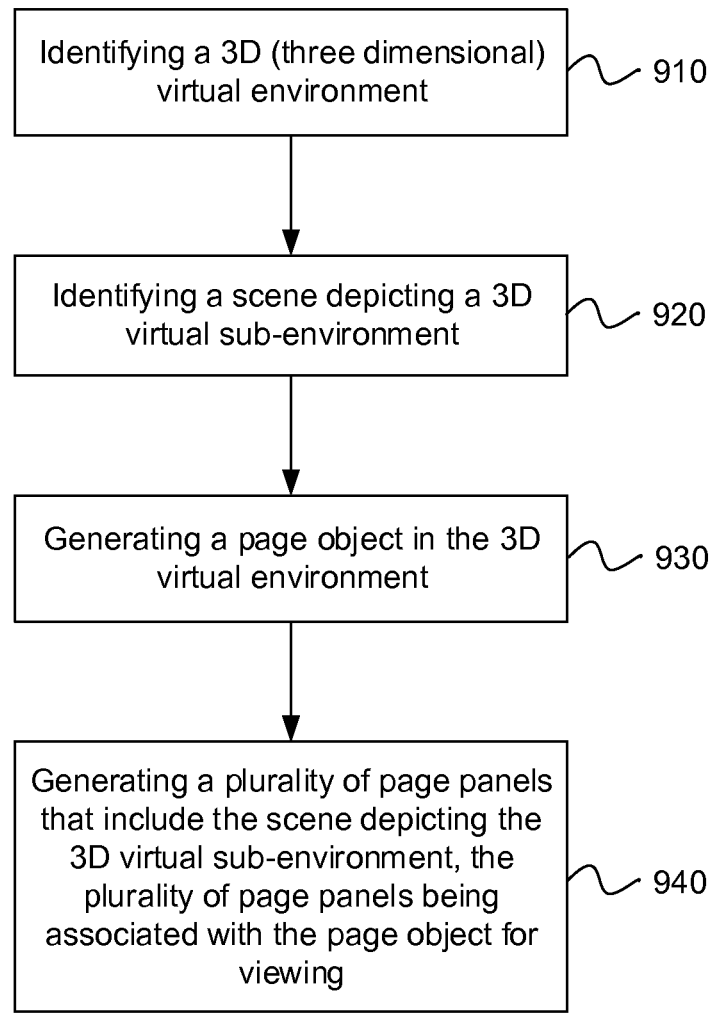
FIG. 9 is a flowchart of an example method for generating an electronic comic book.

FIG. 9 illustrates an example of a method for generating an electronic book. A 3D (three dimensional) virtual environment may be identified, as in block 910. The 3D virtual environment may be an interactive computer-based simulated environment. The 3D virtual environment may include 3D scenes, objects, characters, etc. The 3D virtual environment may be created from a set of geometries, textures, etc.

A scene depicting a 3D virtual sub-environment may be identified, as in block 920. The 3D virtual sub-environments may be computer-based simulated environments. In one example, the 3D virtual sub-environments may be associated with a virtual gaming world. The 3D virtual sub-environments may include interactive 3D scenes or 3D virtual worlds that allow for user interaction. The 3D virtual sub-environments may include a wide variety of landscapes and/or objects, such as castles, houses, vehicles, jungles, beaches, rainforests, cities, rivers, deserts, mountains, etc. Each 3D virtual sub-environment may contain a plurality of objects that make up the 3D scene.

A page object may be generated in the 3D virtual environment, as in block 930. The page object may also be known as a comic book page. The page object depicting the 3D virtual environment may be generated using a page renderer. In one example, the page object may be generated to include panel overlays associated with the page panel in the page object. The page presentation objects may include decorators, narratives, speech bubbles or thought bubbles.

A plurality of page panels that include the scene depicting the 3D virtual sub-environment may be generated, as in block 940. The plurality of page panels may be associated with the page object for viewing. The page panels may also be known as comic book panels. Therefore, a plurality of comic book panels that include the scene depicting the 3D virtual sub-environment may be generated for the comic book page. The page panel having the scene depicting the 3D virtual sub-environment may be generated using a panel renderer. The page object may be provided in the electronic book for display on a client. In addition, the page object may enable user interaction with the scene depicting the 3D virtual sub-environment in the page panel. In other words, a 3D virtual world in the page panel may be interacted with by the user.

In one example, the scene depicting the 3D virtual sub-environment in the page panel may be generated to update geometries or storylines based on previous user interaction with other scenes in the page object. In another example, the page panel may be generated to display a static image of the scene depicting the 3D virtual sub-environment when the page panel is inactive. In other words, the static image may be displayed when the page panel is not receiving user interaction.

In one configuration, the scene depicting the 3D virtual sub-environment that is included in the page panel may be composed of geometries, textures, lightings or backgrounds. In another configuration, the page object may enable the user to switch between the page panel and other page panels on the page object.

In one example, each scene depicting the 3D virtual sub-environment in the page object may be generated using independent databases of geometries, textures, and backgrounds. In another example, the page object depicting the 3D virtual environment may be generated to include a page presentation object that is displayed in front of the page panel. In yet another example, the scene depicting the 3D virtual sub-environment in the page panels may be generated from a perspective view.

Figure 10:
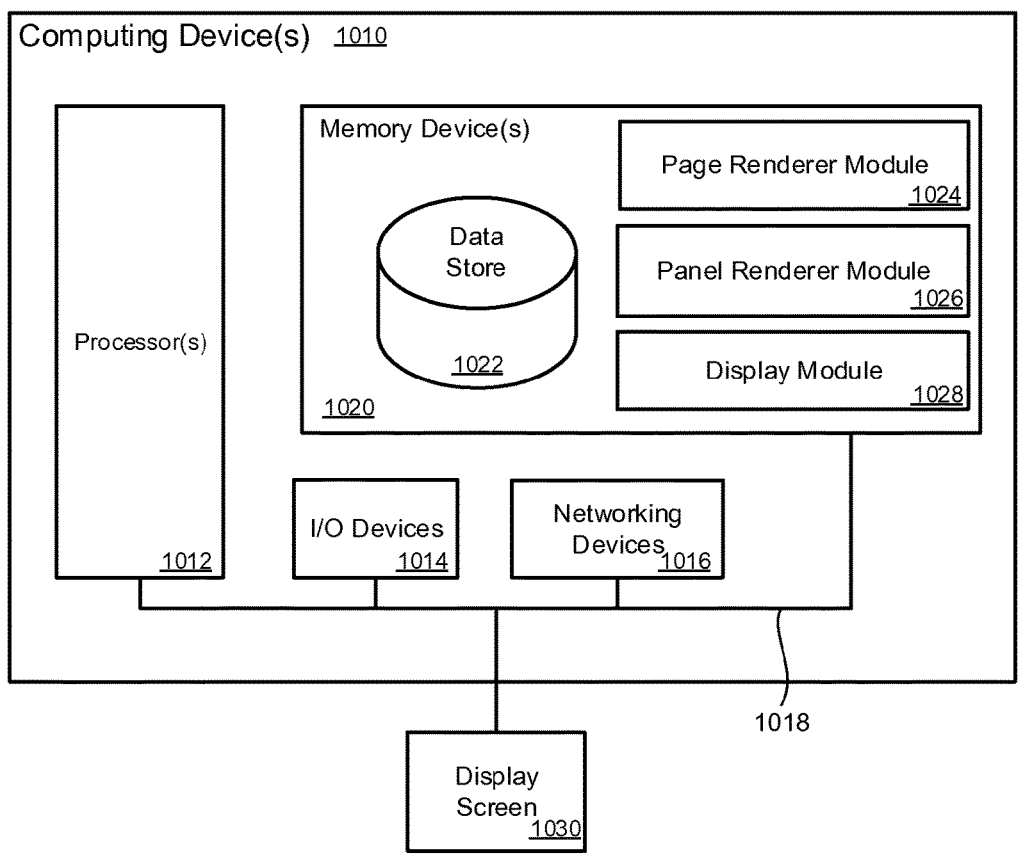
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules that are executable by the processor(s) 1012 and data for the modules. Located in the memory device 1020 are modules executable by the processor. For example, a page renderer module 1024, a panel renderer module 1026, a display module 1028, and other modules may be located in the memory device 1020. The modules may execute the functions described earlier. A data store 1022 may also be located in the memory device 1020 for storing data related to the modules and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen 1030 that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A computer-implemented method for generating an electronic comic book, comprising:
   under control of at least one computer system configured with executable instructions:
   generating a comic book page in a 3D (three dimensional) virtual environment, the 3D virtual environment being viewable using a page renderer, using one or more processors of the computer system;
   generating scenes to depict interactive 3D virtual sub-environments that are viewable through separate panel renderers for each scene, using the one or more processors of the computer system; and
   integrating the comic book page in the interactive 3D virtual environment with comic book panels that include the scenes depicting the interactive 3D virtual sub-environments that are viewable using the separate panel renderers, the comic book page enabling user interaction with the scenes depicting the interactive 3D virtual sub-environments in the comic book panels, using the one or more processors of the computer system.

2. The method of claim 1, further comprising providing the comic book page in the electronic comic book for display to a user.

3. The method of claim 1, further comprising generating the comic book page to include panel overlays associated with the comic book panels in the comic book page, the panel overlays including at least one of: decorators, narratives, speech bubbles or thought bubbles.

4. The method of claim 1, wherein a scene depicting an interactive 3D virtual sub-environment in a comic book panel is generated to include geometries or storylines based on previous user interaction with other scenes in the comic book page.

5. The method of claim 1, further comprising providing a comic book panel configured to display a static image of a scene depicting an interactive 3D virtual sub-environment when the comic book panel is not active.

6. A computer-implemented method for generating an electronic book, comprising:
   under control of at least one computer system configured with executable instructions:
   identifying a 3D (three dimensional) virtual environment, using one or more processors of the computer system;
   identifying a scene depicting a 3D virtual sub-environment, using the one or more processors of the computer system;
   generating a page object in the 3D virtual environment, using the one or more processors of the computer system; and
   generating, using dedicated panel renderers, respective page panels, wherein each page panel includes the scene depicting the 3D virtual sub-environment, and the page panels are associated with the page object for viewing, using the one or more processors of the computer system.

7. The method of claim 6, further comprising providing the page object in the electronic book for display on a client.

8. The method of claim 6, further comprising generating the page object depicting the 3D virtual environment using a page renderer.

9. The method of claim 6, wherein the page object enables user interaction with the scene depicting the 3D virtual sub-environment in the page panel.

10. The method of claim 6, further comprising generating the page object to include panel overlays associated with the page panel in the page object, the panel overlays including at least one of: decorators, narratives, speech bubbles or thought bubbles.

11. The method of claim 6, wherein the scene depicting the 3D virtual sub-environment in the page panel is generated to update geometries or storylines based on previous user interaction with other scenes in the page object.

12. The method of claim 6, further comprising generating the page panel to display a static image of the scene depicting the 3D virtual sub-environment when the page panel is inactive.

13. The method of claim 6, wherein the scene depicting the 3D virtual sub-environment that is included in the page panel is composed of at least one of: geometries, textures, lightings or backgrounds.

14. The method of claim 6, wherein the page object enables a user to switch between the page panel and other page panels on the page object.

15. The method of claim 6, further comprising generating each scene depicting the 3D virtual sub-environment in the page object using independent databases of geometries, textures, and backgrounds.

16. The method of claim 6, further comprising generating the page object depicting the 3D virtual environment to include a page presentation object that is displayed in front of the page panel.

17. The method of claim 6, further comprising:
generating the page object in the 3D virtual environment from an orthographic view; and
generating the scene depicting the 3D virtual sub-environment in the page panels from a perspective view.

18. The method of claim 6, wherein the page object includes a comic book page in the electronic book.

19. The method of claim 6, wherein the page panel includes a comic book panel in the electronic book.

20. A system for generating an electronic comic book, comprising:
a processor;
a memory device including a data store to store a plurality of data and instructions that, when executed by the processor, cause the processor to execute:
a page renderer module configured to generate a comic book page in an interactive 3D (three dimensional) virtual environment, the interactive 3D virtual environment being viewable using the page renderer module;
a panel renderer module configured to generate scenes to depict interactive 3D virtual sub-environments that are viewable using a separate panel renderer for each scene, wherein the panel renderer module is configured to generate comic book panels that include the scenes depicting the interactive 3D virtual sub-environments, wherein the comic book panels are activatable using an activation module to enable user interaction with the scenes depicting the interactive 3D virtual sub-environments in the comic book panels; and a display module configured to provide the comic book page in the electronic comic book for display to a client.

21. The system of claim 20, wherein the activation module is configured to:
activate a comic book panel on the comic book page that is currently receiving interaction from a user; and
deactivate the comic book panels that are not currently receiving interaction from the user, the comic book panels that are deactivated displaying a static image of the scenes depicting the 3D virtual sub-environments.

\* \* \* \* \*